Dec. 12, 1967  S. A. COLLINS, JR., ET AL  3,358,243
LASER HAVING INTERFEROMETER CONTROLLED OSCILLATORY MODES
Filed March 25, 1963  3 Sheets-Sheet 1

INVENTORS
STUART A. COLLINS JR.
GEORGE R. WHITE
BY
Robert J. Haase
ATTORNEY

Dec. 12, 1967  S. A. COLLINS, JR., ET AL  3,358,243
LASER HAVING INTERFEROMETER CONTROLLED OSCILLATORY MODES
Filed March 25, 1963  3 Sheets-Sheet 2

INVENTORS
STUART A. COLLINS JR.
GEORGE R. WHITE
BY
Robert J. Haase
ATTORNEY

Dec. 12, 1967     S. A. COLLINS, JR., ET AL     3,358,243
LASER HAVING INTERFEROMETER CONTROLLED OSCILLATORY MODES
Filed March 25, 1963     3 Sheets-Sheet 3

INVENTORS
STUART A. COLLINS JR.
GEORGE R. WHITE
BY
*Robert J. Haare*
ATTORNEY 3,358,243
LASER HAVING INTERFEROMETER CONTROLLED OSCILLATORY MODES
Stuart A. Collins, Jr., New Hyde Park, and George R. White, Glen Cove, N.Y., assignors to Sperry Rand Corporation, Great Neck, N.Y., a corporation of Delaware
Filed Mar. 25, 1963, Ser. No. 267,591
6 Claims. (Cl. 331—94.5)

The present invention generally relates to lasers and, more particularly, is concerned with lasers characterized by narrow band frequency emission, narrow beam width and enhanced brightness.

Contemporary lasers, for example ruby lasers, produce coherent light energy at a large number of frequencies within a broad spectral band to which the lasers are tuned. An undesired consequence is that the output light power is "diluted" from a frequency point of view which reduces signal to noise ratio at any emission frequency. The importance of concentrating the available light power at one or a few frequencies is clear when one considers such typical applications as optical doppler radars, optical range determining radars and communication systems using optical carriers.

Another shortcoming of presently available lasers is that although beam angles have been greatly reduced relative to the beam angles associated with directional microwave radiations, optical beam angles still are two orders of magnitude removed from the theoretical limit which is approximately 1.8 to $10^{-4}$ radian for a 3/8 inch ruby rod oscillating over its entire cross section. The narrowing of the beam angle of radiated laser beams toward the aforementioned theoretical limit would provide a major improvement in the security or privacy of optical communication systems and in the ability of an optical radar to discriminate in angle between small targets at great ranges.

Attempts have been made to reduce the frequency spectrum and the beam angle of laser radiations. However, such attempts have been directed toward either narrowing the frequency spectrum without appreciably changing the beam angle or narrowing the beam angle without substantially reducing the frequency spectrum. In particular, prior techniques for reducing beam angles have not eliminated any of the axial mode frequencies at which the lasers are capable of oscillation.

One object of the present invention is to provide means for simultaneously reducing the frequency content and narrowing the beam angle of laser radiations.

Another object is to provide laser means for producing radiations of greater brightness within narrow frequency bands.

A further object is to provide laser means for producing emissions of greater brightness having narrow beam angle and narrow frequency content.

An additional object is to provide means placed inside a laser cavity for producing emissions of greater brightness having narrow beam angle and narrow frequency content.

Another object is to provide means for controlling the beam angle and frequency content of laser emissions.

These and other objects of the present invention as will appear from a reading of the following specification are accomplished in an illustrative ruby laser embodiment by the provision of one or more Fabry Perot interferometers or etalons which are placed within the laser cavity and selectively tilted with respect to the axis of the laser. Frequency rejection and beam angle narrowing are achieved by the elimination from the cavity of all light frequencies which do not satisfy the conditions for maximum transmission through the etalon. The energy which would otherwise be absorbed at the eliminated light frequencies tends to transfer to the frequencies which satisfy the etalon transmission requirements whereby the brightness of the light at the latter frequencies is enhanced for a given amount of laser pumping energy. The frequency and the beam angle extent of the emitted laser energy vary with the angular tilt of the etalon relative to the axis of the laser. The greater the angle of tilt, the higher the frequency and the narrower the beam angle of each mode of the laser. One tilted etalon produces beam narrowing along only one direction. A second etalon tilted about an axis at right angles to the axis about which the first etalon is tilted may be introduced to effect beam narrowing along a second direction perpendicular to the first direction.

A feature of the invention is its adaptability to all types of lasers including dielectric crystal lasers, gas lasers, and the recently announced gallium arsenide injection lasers. All that is necessary is that the etalon or etalons of the present invention be introduced internal to the laser cavity between the end mirrors thereof.

For a more complete understanding of the present invention, reference should be had to the following specification and to the appended figures of which:

Figure 1:
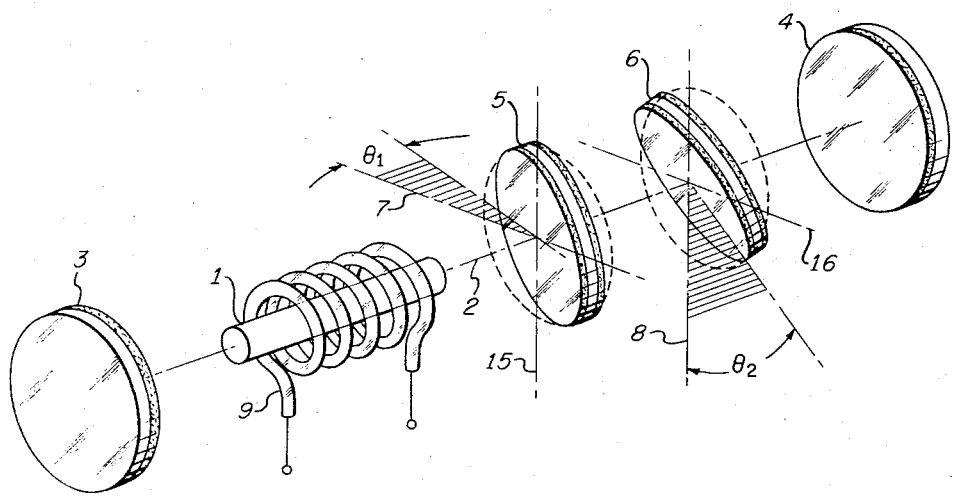
FIG. 1 is a diagrammatic sketch of the basic components utilized in an illustrative ruby laser embodiment of the present invention.

Referring to FIG. 1, pulsed ruby crystal 1 is located along optical axis 2 between the end mirrors 3 and 4 which define the extremities of the laser cavity. A pair of interferometers such as, for example, a pair of Fabry Perot etalons 5 and 6 are positioned between one end of ruby 1 and end mirror 4. It should be noted, however, that etalons 5 and 6 need not be placed at the same end of the ruby rod within the cavity. Alternatively, each etalon could be positioned at a respective end of the rod. Mirrors 3 and 4 are mounted parallel to each other and perpendicular to axis 2 whereas etalons 5 and 6 are adapted to be tilted about respective axes which are perpendicular to each other and perpendicular to axis 2. For example, etalon 5 is tilted about axis 15 by an angle $\theta_1$ with respect to the normal 7 whereas etalon 6 is tilted about axis 16 by angle $\theta_2$ with respect to a normal 8. Normals 7 and 8 are perpendicular to each other and perpendicular to optical axis 2. Ruby 1 is excited or "pumped" by a conventional flash tube 9 to an energy level above the metastable energy level from which radiative decay takes place. As is well-known, the radiative decay of the pumped ruby crystal produces a spectral emission at 6943 angstroms having a line width of approximately 325 gigacycles at room temperature.

The laser cavity which is defined by the space between the end mirrors 3 and 4 will support coherent oscillations at frequencies which have an integral number of half wave lengths between the end mirrors. A laser cavity with a length of 46 centimeters, for example, resonates at modes 325 megacycles per second apart. Inasmuch as the line width of the illustrative ruby emission is 325 gigacycles, the laser cavity will support the quotient of $325 \times 10^9$ and $325 \times 10^6$ or a total of 1000 resonant modes. One objective of the invention, i.e., the sharp reduction in the number of resonant modes, is achieved by the provision of quartz flats having reflective coatings such as dielectric coatings which operate as Fabry Perot interferometers. At the same time, the frequency of each resonate mode is increased and the beam width of the emitted coherent light is substantially reduced. The latter two phenomena are graphically depicted in the plot of FIG. 2.

Figure 2:
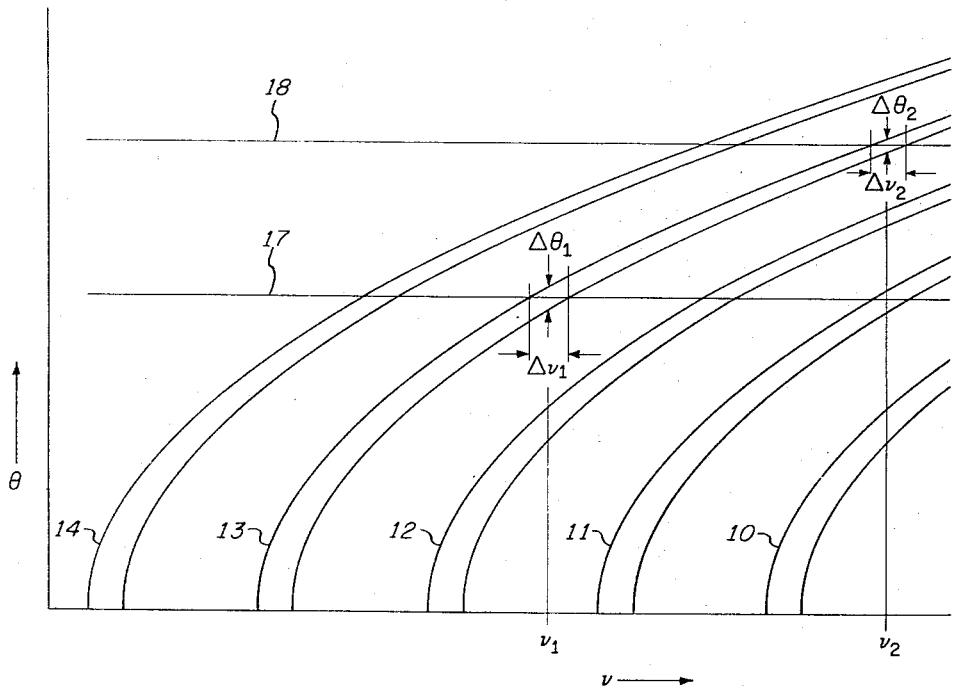
FIG. 2 is a plot of the transmission characteristic of a Fabry Perot etalon utilized in the embodiment of FIG. 1.

FIG. 2 sets forth the optical transmission characteristic of a Fabry Perot interferometer in terms of the angle of incident light for maximum transmission versus the frequencies of incident light for maximum transmission. The maximum transmission frequencies are separated the same amount. As the angle of the incident light departs from the normal, the frequency for maximum transmission increases and the angular band width is reduced. For example, if the angle of the incident light is the one represented by horizontal line 17 in FIG. 2, then the frequency for maximum transmission of pass band 13 is $v_1$. The line width about frequency $v_1$ is represented by $\Delta v_1$. The corresponding angular bandwidth is represented by $\Delta \theta_1$. As the angle of the incident light is increased to a value represented by horizontal line 18, the frequency for maximum transmission of pass band 13 is increased to the value $v_2$. The corresponding frequency line width and angular bandwidth are represented by $\Delta v_2$ and $\Delta \theta_2$ respectively. It should be noted that not only is the frequency for maximum transmission increased by increasing the angle of the incident light relative to the plane of the interferometer, but the angular bandwith of the interferometer has also been substantially reduced, i.e., $\Delta \theta_2$ is less than $\Delta \theta_1$.

It has been found that the introduction of etalon 5 or etalon 6 produces enhanced brightness at the frequencies of the coherent light issuing from the laser cavity. It is believed that some of the energy which would otherwise be absorbed by the rejected modes (if the etalon were removed from the laser cavity) is transferred to the modes which are transmitted by the interferometer (when the etalon is placed within the laser cavity) with a concomitant increase in the brightness of the transmitted modes. This result would not be obtained if the etalon were placed outside of the laser cavity. In the latter case, energy would be absorbed by all of the oscillatory modes which the cavity would support. The mere rejection of certain of the modes by an etalon external to the cavity would simply waste the energy of the rejected modes without any concomitant increase in brightness of the transmitted modes. Other advantages accruing to the positioning of the etalon inside the cavity, relative to the positioning of an etalon outside the cavity include a cumulative decrease in the beam angle of the coherent light. It will be observed that the oscillatory energy within the cavity passes many times through the interferometer while the coherent oscillations are building up. So long as the beam angle of the coherent light exceeds the angular band width of the etalon, the beam angle is reduced by the action of the etalon. The large number of beam traversals through the internal etalon insures minimum final beam angle. The same high degree of beam narrowing could not be achieved by a single beam traversal which would be the case if the etalon were placed external to the cavity. Beam angle narrowing is achieved in a single plane by the use of a single etalon. The beam angle may be reduced in a second plane perpendicular to the first by the provision of a second etalon. Two-axis beam narrowing is achieved through the use of etalons 5 and 6 in FIG. 1.

Figure 3:
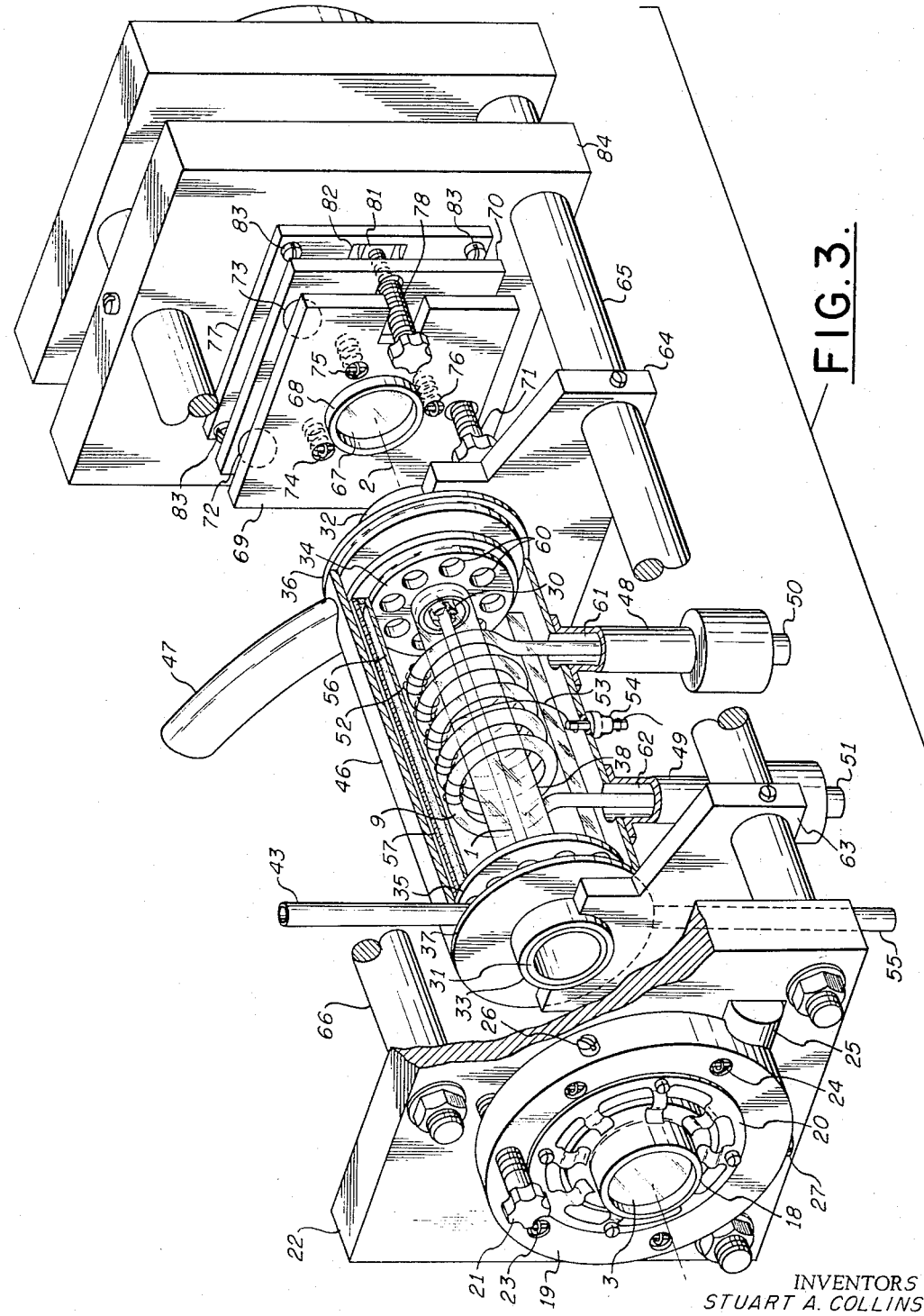
FIG. 3 is a simplified perspective view of a ruby laser constructed in accordance with the present invention.
Figure 4:
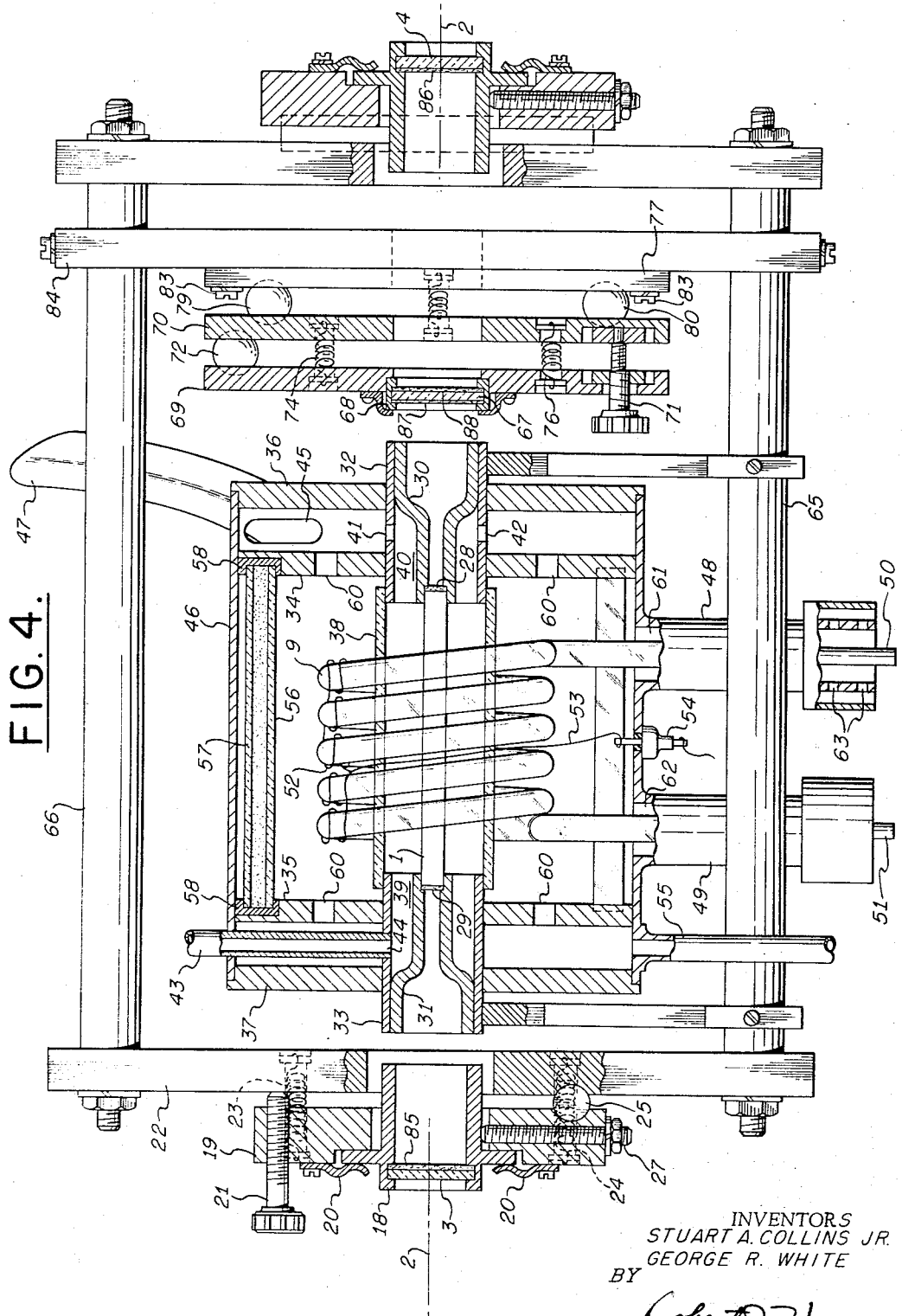
FIG. 4 is a simplified cross-sectional view of the apparatus of FIG. 3 taken along the optical axis thereof.

FIG. 3 is a perspective view and FIG. 4 is a cross-sectional view of a ruby laser which was successfully operated in accordance with the present invention. The structural members of FIGS. 3 and 4 are designated by the same numbers utilized for the corresponding members discussed in connection with FIG. 1. Referring to FIGS. 3 and 4, mirror 3 is mounted within cylindrical holder 18 which, in turn, is attached to collar 19 by means of circular spring clamp 20. Screw 21 threadably engages collar 19 and is biased against end plate 22 by means of springs 23 and 24. Collar 19 is pivoted about cylindrical pin 25 so that the angle between end mirror 3 and optical axis 2 may be adjusted by the rotation of screw 21. The adjustment is provided for initially aligning end mirror 3 perpendicular to optical axis 2. End mirror 3 may be centered about axis 2 by the adjustment of three centering screws located at 120° relative to each other about optical axis 2. Two of the centering screws 26 and 27 appear in the drawings.

Ruby rod 1 is coated at its opposite ends by non-reflective coatings 28 and 29 which serve as optical impedance matches between the ruby rod material and the atmosphere external to the ruby. It should be especially noted, unlike conventional prior art ruby lasers, that the end mirrors defining the cavity are not mounted on the ends of the ruby itself. Ruby 1 is supported at opposite ends by flared collars 30 and 31 which are fitted within sleeves 32 and 33. Apertured discs 34 and 35 and circular plates 36 and 37 are mounted about respective sleeves 32 and 33.

Transparent glass tube 38 extends between sleeves 32 and 33 to form a cooling duct surrounding the surface of ruby rod 1. The cooling duct includes annular passages 39 and 40. Passage 40 is vented to the space between disc 34 and plate 36 by apertures 41 and 42 in sleeve 32. Passage 43 is coupled to cooling air supply duct 43 by means of aperture 44 in sleeve 33. Aperture 45 in cylindrical outer shell 46 completes the air passageway for cooling ruby 1 through exhaust tube 47.

Helical flash tube 9 is supported at its opposite ends by terminal sleeves 48 and 49. Electrode potentials are applied to the opposite ends of flash tube 9 via electrical connectors 50 and 51. An igniter coil 52 is wound about flash tube 9 and is connected by lead 53 to trigger electrode 54. A source of high frequency energy (not shown) is connected to trigger electrode 54 to provide a high intensity electrical field about flash tube 9 for the ignition thereof. The continuous discharge of flash tube 9, once ignited, is maintained by the potential applied to electrodes 50 and 51.

Means are also provided for cooling flash tube 9. Said means comprises input cooling air duct 55, the space between apertured disc 35 and plate 37, and the annular cavity between the exterior of glass tube 38 and glass tube 56. Said annular cavity is vented through the apertures in disc 34 to exhaust tube 47. Glass tube 56 provides one wall of the double walled glass cylinder; the other wall is formed by glass tube 57. The doubled walled glass cylinder, in turn, is supported between annular grooves 58 cut into discs 34 and 35. The space between glass tubes 56 and 57 is filled with a highly reflective powder such as magnesium oxide to conserve the pumping light emitted by flash tube 9. It should be noted that glass cylinders 56 and 57 extend less than a full 360° about ruby rod 1 to allow access for the legs of flash tube 9.

A feature of the construction of the illustrative embodiment is that the electrodes of the flash tube also are cooled by the air supplied via tube 55. The cooling air exits not only through the apertures 60 within disc 34 but also through the annular spaces 61 and 62 between the legs of flash tube 9 and the electrode mounting sleeves 48 and 49. The annular spaces 61 and 62 are vented to the atmosphere through the apertures 63 shown in the cutaway view of the housing surrounding electrode 50 in FIG. 4. The entire ruby assembly is mounted between brackets 63 and 64 attached to the bottom two of the three guide rails.

Only one etalon assembly is shown in the embodiment of FIGS. 3 and 4 for the sake of simplicity and clarity. As previously discussed, one or two etalons may be employed depending upon whether beam narrowing is desired in one or two planes, respectively. The single etalon quartz flat 67 is mounted within ring holder 68 affixed to plate 69. Plate 69 is separated from plate 70 by differential screw 71 and by balls 72 and 73 which are mounted in respective sockets cut into plates 69 and 70. Plates 69 and 70 are resiliently biased toward each other by means of springs 74, 75 and 76. Plate 69 may be tilted about an axis defined by balls 72 and 73 relative to plate 70 by adjustment of differential screw 71.

Plate 70 is separated from plate 77 by differential screw 78 and balls 79 and 80 which are secured within respective sockets formed by recesses cut into plates 70 and 77. Differential screw 78 engages plate 70 and pushes against plate 77 via semi-cylindrical slider 81 which rides within semi-cylindrical slot 82 cut within plate 77. The purpose of the slider and slot arrangement is to permit the lateral movement of differential screw 78 as it is advanced or withdrawn with respect to plate 70. A similar arrangement is provided for differential screw 71 to permit the lateral movement of screw 71 as said screw is advanced or withdrawn with respect to plate 69. The mounting arrangement for etalon 67 facilitates its initial alignment relative to the optical axis and its subsequent closely controlled tilting to the desired angle. The interferometer assembly is affixed by screws 83 to mounting plate 84 which is supported by the three guide rails including rails 65 and 66. End mirror 4 is mounted in a manner substantially identical to the one previously described in connection with end mirror 3. For that reason, a detailed description of end mirror 4 will not be given here.

It should be noted that reflective coatings 85 and 86 are formed on the inner surfaces of mirrors 3 and 4, respectively, and reflective coatings 87 and 88 are formed on both surfaces of etalon quartz flat 67 by the deposition of successive layers of dielectric material as is conventional practice. In a typical embodiment of the present invention, the following parameter values were found to be satisfactory:

Reflectivity of end mirrors 3 and 4 _____percent__ 99
Reflectivity of each surface of quartz flat __do____ 67–70
Effective optical length of cavity between mirrors 3 and 4 _____cm__ 47
Dimensions of quartz flat 67 _____ (1)
Dimensions of ruby rod 1 _____ (2)

[1] 1⅛″ dia. x ⅛″ thick.
[2] ⅜″ dia. x 4″ long.

Although a dielectric crystal is disclosed in the illustrative embodiment of FIGS. 1, 3, and 4, the nature of the laser material (dielectric crystal in the case of ruby) employed in the laser cavity is not a limitation of the present invention. Other conventional laser materials also are suitable such as gases and semiconductors.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. A laser comprising
a resonant cavity comprising first and second reflective surfaces separated from each other along an axis,
an etalon comprising third and fourth reflective surfaces positioned along said axis between said first and second reflective surfaces,
said etalon being tilted relative to said axis for controlling the frequency and beam angle of the laser output,
laser material within said cavity directly between said first and third reflective surfaces for producing a beam of coherent light along said axis, and
pumping means for exciting said laser material.
2. A laser comprising
a resonant cavity comprising first and second reflective surfaces separated from each other along an axis,
an etalon comprising third and fourth reflective surfaces positioned along said axis between said first and second reflective surfaces,
means for varying the angular relationship between said axis and said etalon for controlling the frequency and beam angle of the laser output,
laser material within said cavity directly between said first and third reflective surfaces for producing a beam of coherent light along said axis, and
pumping means for exciting said laser material.
3. A laser comprising
a resonant cavity comprising first and second reflective surfaces separated from each other along an axis,
first and second etalons positioned at respective points along said axis between said first and second reflective surfaces,
said first and second etalons being tilted at respective angles relative to said axis for controlling the frequency and beam angle of the laster output,
said first etalon comprising third and fourth reflective surfaces and said second etalon comprising fifth and sixth reflective surfaces,
laser material within said cavity directly between said first and third reflective surfaces for producing a beam of coherent light along said axis, and
pumping means for exciting said laser material.
4. A laser comprising
a resonant cavity comprising first and second reflective surfaces separated from each other along an axis,
first and second etalons positioned at respective points along said axis between said first and second reflective surfaces,
means for varying the angular relationship between said axis and each of said first and second etalons for controlling the frequency and beam angle of the laser output,
said first etalon comprising third and fourth reflective surfaces and said second etalon comprising fifth and sixth reflective surfaces,
laser material within said cavity directly between said first and third reflective surfaces for producing a beam of coherent light along said axis, and
pumping means for exciting said laser material.
5. A laser comprising
a resonant cavity,
laser material within said cavity for producing a beam of coherent light along an axis within said cavity,
pumping means for exciting said laser material,
interferometer means positioned along said axis within said cavity in the path of said beam, and
said interferometer means being tilted relative to said axis for controlling the frequency and beam angle of the laser output.
6. A laser comprising
a resonant cavity,
laser material within said cavity for producing a beam of coherent light along an axis within said cavity,
pumping means for exciting said laser material,
an etalon positioned along said axis within said cavity in the path of said beam, and
means for varying the angular relationship between said axis and said etalon for controlling the frequency and beam angle of the laser output.

References Cited
UNITED STATES PATENTS

| | | | |
|---|---|---|---|
| 2,929,922 | 3/1960 | Schawlow et al. | 331—94.5 |
| 3,134,837 | 5/1964 | Kisliuk et al. | 331—94.5 |
| 3,183,937 | 5/1965 | Earley et al. | 331—94.5 |

JEWELL H. PEDERSEN, *Primary Examiner.*

RONALD L. WIBERT, *Examiner.*